(12) United States Patent
Gallucci

(10) Patent No.: US 6,646,027 B2
(45) Date of Patent: *Nov. 11, 2003

(54) HIGH MODULUS POLYETHER SULFONE COMPOSITIONS WITH IMPROVED IMPACT

(75) Inventor: Robert R. Gallucci, Mt. Vernon, IN (US)

(73) Assignee: General Electric Company, Pittsfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/064,645

(22) Filed: Aug. 2, 2002

(65) Prior Publication Data

US 2003/0027895 A1 Feb. 6, 2003

Related U.S. Application Data

(63) Continuation of application No. 09/785,601, filed on Feb. 16, 2001, now Pat. No. 6,495,615.

(51) Int. Cl.[7] .............................. C08K 9/04; C08K 3/40; C08G 75/20
(52) U.S. Cl. ...................... 523/217; 523/210; 523/212; 524/492; 528/391
(58) Field of Search .............................. 523/217, 210, 523/212; 524/492; 528/391

(56) References Cited

U.S. PATENT DOCUMENTS

| 5,384,353 | A | * | 1/1995 | Gemmell et al. |
| 6,013,716 | A | | 1/2000 | Nomura et al. |
| 6,060,538 | A | * | 5/2000 | Gallucci |
| 6,495,615 | B1 | * | 12/2002 | Gallucci |

FOREIGN PATENT DOCUMENTS

| CA | 847963 | 7/1970 |
| WO | WO 94/16129 | 7/1994 |

OTHER PUBLICATIONS

Chemical Abstracts Record for JP 04–122774, 4/92.

Chemical Abstracts Record for JP 2000–309707, 11/00.

* cited by examiner

*Primary Examiner*—Tae H. Yoon

(57) ABSTRACT

The invention relates to a thermoplastic resin with improved impact strength comprising a) a thermoplastic polyether sulfone resin and b) glass fibers treated with a polyolefin wax. The polyolefin wax may be polyethylene wax, polypropylene wax, polyethylene-propylene wax, or polyethylene-butylene wax. The polyethersulfone resin glass blend has high modulus and improved impact strength.

17 Claims, No Drawings

HIGH MODULUS POLYETHER SULFONE COMPOSITIONS WITH IMPROVED IMPACT

CROSS REFERENCE TO RELATED APPLICATIONS

This application is a continuation of U.S. application Ser. No. 09/785,601, filed Feb. 16, 2001 now U.S. Pat. No. 6,495,615.

BACKGROUND OF THE INVENTION

The present invention is directed to glass reinforced thermoplastic polyethersulfone resins that contain uniformly dispersed glass fiber. The polyethersulfone resin glass blend has high modulus and improved impact strength.

DESCRIPTION OF THE RELATED ART

Fibrous glass is incorporated with a thermoplastic polymer as an aid to improve mechanical properties. In the manufacture of the fibrous glass, filaments are first formed from molten glass through the use of various processes. The filaments are coated and then gathered into a bundle known as a strand. In order to bind the filaments into a strand and so that the strand can be easily handled, a binder or binding agent is applied to the glass filaments. Subsequently, the strand can be chopped into various lengths as desired. These are called chopped strands. Some of these binding agents are polymers such as polyvinyl acetate, particular polyester resins, starch, acrylic resins, melamine, polyvinyl chloride, polyethylene oxide, polyurethane, polyepoxide, or polyvinyl alcohol. The glass fibers are also treated with coupling agents, often functionalized silane compounds, to improve adhesion of the fiber to the matrix resin.

For thermoplastic polyethersulfones, the fibrous glass enhances the mechanical properties of the resin. Usually, the glass coatings along with silane coupling agents are designed to give good adhesion of the glass to resin. This adhesion gives rise to improved strength and mechanical properties. Unfortunately the addition of such fiber glass can substantially lower the impact strength of a polysulfone resin as measured by notched, unnotched, reversed notched Izod or biaxial impact. Flexural and tensile elongation are also significantly reduced. Thus there exists a need for polyether sulfone resin glass fiber blends that have high modulus and good impact strength.

Improved impact in glass filled resins has been achieved by addition of rubbery modifiers. But adding another component to the blend adds complication and results in an undesirable reduction of modulus. Additionally most rubbery modifiers cannot survive the high processing temperatures needed to mold polysulfone thermoplastics.

Another traditional method to improve the impact of glass filled thermoplastics is to add coupling agents to the mixture to improve glass fiber resin bonding. This is often accomplished by modification of the glass fiber surface to bond more strongly to the resin to give better mechanical properties. In almost every glass filled thermoplastic resin improved impact strength and high modulus are achieved thorough modification of the fiber coating to improve the bond between the glass and resin. The only exception to this is the use of a non bonding glass in polycarbonate resins and certain blends where polycarbonate resin is the major component, for example in U.S. Pat. Nos. 6,060,583 and 5,384,411. Improved impact in glass filled polymers through the use of a coating that does not bond well to the matrix has not been observed in any other resins until now.

This invention marks the time polyolefin coated wax fiber glass has been seen to improve properties of a polyethersulfone and surprisingly it is only effective in specific types of polyethersulfone resins that have predominately biphenol derived linkages. This is the first time that this improved impact behavior has been seen in a non-polycarbonate based resin.

BRIEF SUMMARY OF THE INVENTION

In accordance with the present invention, thermoplastic resin compositions comprise a polyethersulfone resin and glass fibers which have been treated with a coating agent comprising a polyolefin wax and optionally a coupling agent comprising a functionalized silane binding agent.

The thermoplastic resin compositions are useful for processing by injection molding, extrusion and blow molding, and exhibit improved properties such as increased Izod impact strength, increased biaxial impact energy, and increased ductility versus blends made with standard glass fibers giving good adhesion to the matrix.

DETAILED DESCRIPTION OF THE INVENTION

The glass fibers which are uniformly dispersed in the polyethersulfone resin blend are those that have been treated with a coating agent comprising (i) a polyolefin wax and optionally (ii) a functionalized silane coupling agent.

These polyolefin waxes preferably comprise polyethylene wax or polypropylene wax or copolymers thereof such as polyethylene-propylene wax and polyethylene-butylene wax. A particularly suitable polyolefinic wax is polyethylene wax. These polyolefin waxes are well known to those skilled in the art and are available commercially. The polyolefin waxes are preferably based on olefins having from 2 to 18 carbon atoms, more preferably from 2 to 8 carbon atoms, and most preferably from 2 to 4 carbon atoms. Alpha olefin-ethylene copolymers are also useful as coating waxes. The polyolefin wax may also have a small amount of a polar co-monomer such as an unsaturated carboxylic acid, carboxylic ester or carboxylic acid salt. Such functionality will generally be less than 5%. A slight degree of polarity in the wax can be helpful in emulsifying it so that it can coat the glass fiber as an aqueous emulsion.

The functionalized silanes, such as alkoxy silanes, are preferably selected from the group of aminopropyl triethoxy silane, glycidyl propyl trimethoxy silane, (3,4-epoxycyclohexyl) ethyl trimethoxy silane, mercaptopropyl alkoxy silane, aminoethyl aminopropyl alkoxy silane and ureidoalkyl trimethoxy silanes. Particularly useful are aminopropyl triethoxy silane and glycidyl-propyl trimethoxy silane. Preferred functionality of the functionalized silane is epoxy functionality or amine functionality.

Other materials can also be employed with the glass coating agent so used in this invention and include such materials as anti-static agents, coupling agents, lubricants, wetting agents, etc.

The coating agent preferably comprises at least 50 percent by weight polyolefin wax based on the total weight of the coating agent, for example 50 to 100 percent by weight thereof, preferably from 70 to 95 percent by weight thereof and optional further comprises from 1 to 50 percent by weight functionalized silane based on the total weight of the coating agent, preferably from 1 to 20 percent by weight thereof.

The glass fibers that are employed in the practice of this invention are preferably glass strands that have been treated with a coating agent comprising a polyolefin wax and optionally a functionalized silane.

In preparing the glass fibers, a number of filaments can be formed simultaneously, treated with the coating agent and then bundled into a strand. Alternatively the strand itself may be first formed of filaments and then treated with a coating agent. The coatings are often cured by use of a subsequent heat treatment. The amount of the coating agent employed is generally that amount which is sufficient to bind the glass filaments into a continuous strand. Generally, this may be from 0.1 to 5.0% by weight of the glass fiber. Coatings levels of about 1.0 weight percent based on the weight of the glass filament are preferred. As employed, the glass fibers if in the form of chopped glass strands, may be one-sixteenth to one inch long or less but are preferably one-eighth inch long.

In the practice of this invention, the coated glass fibers, preferably coated, chopped glass strands, may be first blended with the polyethersulfone resin and then fed to an extruder and the extrudate cut into pellets, or they may be separately fed to the feed hopper of an extruder. Generally, in the practice of this invention for preparing pellets of the composition set forth herein, the extruder is maintained at a temperature of approximately 550° F. to 650° F. The pellets so prepared when cutting the extrudate may be one-half inch long or less. Such pellets contain finely divided uniformly dispersed glass fibers in the blend composition comprising polyethersulfone resin. The dispersed glass fibers are reduced in length as a result of the shearing action on the chopped glass strands in the extruder barrel.

The filamentous glass to be coated with the coating agent in the present compositions is known to those skilled in the art and is available from a number of manufacturers. For compositions ultimately to be employed for electrical uses, it is preferred to use fibrous glass filaments comprised of lime-aluminum borosilicate glass that is relatively sodium free. This is known as "E" glass. However, other glass compositions are useful in the practice of the present invention, and all such glasses are contemplated as within the scope of the present invention. The filaments are made by standard processes, e.g., by steam or air blowing, flame blowing and mechanical pulling. The preferred filaments for plastic reinforcement are made by mechanical pulling. The filament diameters preferably range from about 3–20 microns. Use of non round glass fiber cross sections are also possible.

In preparing the molding compositions of the present invention, it is convenient to use filamentous glass in the form of chopped strands of from about one-eighth to about 1 inch long. In articles molded from the compositions, on the other hand, even shorter lengths will be encountered because, during compounding, considerable fragmentation will occur.

The amount of coating agent employed can generally be selected as desired. Typically, the amount ranges from about 0.1 to about 5 by weight, and more typically ranges from about 0.5 to 2% by weight, based on the weight of the glass fibers. The surface coating means can be selected among any known to those skilled in the art. The coating agent may be applied to the glass fibers by conventional means. In general, the fibers are coated by immersing the fibers in the coating agent or contacting the fibers with an aqueous emulsion, or suspension of the coating.

Preferably the glass fibers are present at a level of from 5 to 50 percent by weight based on the total weight of the composition, and more preferably present at a level of from 7 to 25 percent by weight based on the total weight of the composition. The improved impact is most apparent at low glass loadings on the order of 5 to about 25 percent by weight of the whole composition.

The matrix resin materials are thermoplastic polyethersulfones frequently prepared as described in U.S. Pat. Nos. 3,634,355; 4,008,203; 4,108,837 and 4,175,175.

Polyaryl ether sulfones, also referred to as polysulfones, polyether sulfones and polyphenylene ether sulfones are linear thermoplastic polymers that possess a number of attractive features such as high temperature resistance, good electrical properties, and good hydrolytic stability. A variety of polyaryl ether sulfones are commercially available, including the polycondensation product of dihydroxydiphenyl sulfone with dichlorodiphenyl sulfone and known as polyether sulfone (PES) resin, and the polymer of bisphenol-A and dichlorodiphenyl sulfone known in the art as polysulfone (PSF) resin. A variety of PES copolymers, for example comprising Bisphenol A moieties and diphenyl sulfone moieties in molar ratios other than 1:1, may also be found.

Other polyaryl ether sulfones are the polybiphenyl ether sulfone resins, available from BP Amoco Polymers, Inc. under the trademark of RADEL R resin. This resin may be described as the product of the polycondensation of biphenol with 4,4'-dichlorodiphenyl sulfone and also is known and described in the art, for example, in Canadian Patent No. 847,963.

Methods for the preparation of polyaryl ether sulfones are widely known and several suitable processes have been well described in the art. Two methods, the carbonate method and the alkali metal hydroxide method, are known and used for this purpose. In the alkali metal hydroxide method, a double alkali metal salt of a dihydric phenol is contacted with a dihalobenzenoid compound in the presence of a dipolar, aprotic solvent under substantially anhydrous conditions. The carbonate method, in which at least one dihydric phenol and at least one dihalobenzenoid compound are heated, for example, with sodium carbonate or bicarbonate and a second alkali metal carbonate or bicarbonate is also disclosed in the art, for example in U.S. Pat. No. 4,176,222. Alternatively, the polybiphenyl ether sulfone, PSF and PES resin components may be prepared by any of the variety of methods known in the art for the preparation of polyaryl ether resins.

The molecular weight of the polysulfone, as indicated by reduced viscosity data in an appropriate solvent such as methylene chloride, chloroform, N-methylpyrrolidone, or the like, will be at least 0.3 dl/g, preferably at least 0.4 dl/g and, typically, will not exceed about 1.5 dl/g.

Surprisingly we have found that only polyethersulfone resins with a significant portion of linkages derived from biphenol (poly-biphenylether sulfones, also referred to as poly phenylene sulfones, PPSU) show improved ductility when combined with a polyolefin wax coated non bonding glass. Use of a standard bonding glass at the same level in the same resin shows lower impact and elongation.

The preferred polyethersulfone can be a homopolymer or a copolymer and will have $\geq 50$ mole % biphenol ether derived units, more preferably the poly biphenol ether sulfone will have $\geq 75$ mole % biphenol derived linkages and most preferably the poly biphenol ether sulfone will have $\geq 90$ mole % biphenol derived linkages.

The polyether sulfone is preferred to have good impact in the absence of fiber glass, with a notched Izod value, as measured on one-eight inch bars by ASTM D256, of ≧3 ft-lbs./in. and with a notched Izod value of ≧10 ft-lbs/in. being most preferred.

Preferred blends of polyolefin coated glass fiber with biphenol based polyethersulfones will have a flexural modulus, as measured on one-eight inch thick bars, by ASTM D790, of ≧400,000 psi. Izod impact strength, as measured on one-eight inch bars by ASTM D256, should be ≧2 ft-lbs/in. The preferred glass filled blends of the invention should have an unnotched Izod value, as measured on one-eight inch thick bars by ASTM D256, of ≧115 ft-lbs./in.

The composition of the invention can also be combined with other ingredients such as mineral fillers; for example, talc, clay, mica, barite, wollastonite, silica, milled glass and glass flake. Colorants such as titanium dioxide, zinc sulfide and carbon black; stabilizers such as hindered phenols, aryl phosphites and thioesters, as well as mold release agents, lubricants, flame retardants, smoke suppressors, anti-drip agents, for instance those based on fluoro polymers, and ultra violet light stabilizers can also be added to the composition in effective amounts.

The composition of this invention finds utility in preparing or forming articles by injection molding, extrusion, compression molding or blow molding wherein the articles have increased impact strength by employing the fibrous glass so described herein.

EXAMPLES

The following examples illustrate the present invention, but are not meant to be limitations to the scope thereof.

Examples 1,2,3,A,B,C

Examples of the invention 1,2,3 and comparative examples A, B, C were run in a similar fashion. Polyether sulfone resin (PPSU) derived from biphenol and dichloro diphenyl sulfone, available from AMOCO Co. as RADEL R resin, was dry blended with glass fibers in a drum at room temperature in amounts shown in Table 1.

OC415A14C is an olefin wax coated borosilicate chopped glass fiber with a 14 micron diameter sold by Owens Corning Co. OC165A11C is an amino silane treated glass fiber with a polyurethane coating having an 11 micron diameter. It is also sold by Owens Corning Co. OC165A11C is recommend for high temperature thermoplastics such as polysulfone.

The mixtures were melt mixed on a vacuum vented 2.5 in. single screw extruder at ~650° F. and ~80 rpm to give blends which were extruded into strands, cooled and chopped into pellets. The pellets were subsequently dried and injection molded into ⅛ inch thick test specimens. Tests shown in Tables 1 & 2 were conducted as follows: Tensile properties; ASTM D638, Flexural properties; ASTM D790, Izod Impact; ASTM D256 and biaxial impact as per ASTM 3763.

Notched Izod testing used a 2 lb. hammer, reverse notched Izod used a 5 lb. hammer and unnotched Izod testing used a 10 lb. hammer.

Note that the examples of the invention (Table 1) all show superior notched, and unnotched Izod impact compared to the controls. Examples 1, 2 & 3 show high flexural modulus and have improved biaxial impact over the controls using standard glass fibers. Blends using the olefin wax coated glass also show improved tensile and flexural elongation.

TABLE 1

Examples 1, 2, 3, A, B, C

|  | 1 | A | 2 | B | 3 | C |
|---|---|---|---|---|---|---|
| PPSU | 93 | 93 | 85 | 85 | 75 | 75 |
| OC415A | 7 | 0 | 15 | 0 | 25 | 0 |
| OC165A | 0 | 7 | 0 | 15 | 0 | 25 |
| % Elong. @ break | 10.8 | 9.9 | 8.0 | 6.0 | 5.0 | 3.6 |
| Flex Mod. Kpsi | 457 | 436 | 565 | 505 | 814 | 848 |
| Strain @ break % | no break | no break | 8.3 | 7.3 | 5.0 | 4.2 |
| N. Izod ft-lbs/in | 2.6 | 1.4 | 2.5 | 1.6 | 3.3 | 2.1 |
| Un Izod ft-lbs/in | 36.4 | 31.0 | 25.2 | 15.8 | 15.7 | 13.9 |
| Reverse N. Izod Biaxial impact | 29.4 | 22.9 | 14.6 | 12.0 | 10.9 | 10.6 |
| Total Energy ft-lbs | 29.0 | 19.9 | 21.0 | 16.6 | 16.7 | 12.0 |

PPSU = RADEL R 5000 diphenyl sulfone biphenol polymer
OC415 A is an olefin wax coated borosilicate E Glass
OC165 A is an organo silane coated borosilicate E Glass

Examples D, E

Comparative examples D and E were run with a polysulfone resin derived from bisphenol A and dichloro diphenyl sulfone, available from AMOCO Co. as UDEL resin. Example D was run with 15% of the polyolefin wax coated glass OC415A14C and example E was run the polyurethane amino silane coated glass OC165A11C. Properties are shown in Table 2. Notice that in this polysulfone, which has no biphenol derived linkages, the blends had similar Izod and biaxial impact strengths. The improved impact that the polyolefin wax coated glass, OC415A, brought to the biphenol derived polysulfone was surprisingly not observed.

TABLE 2

Examples D & E

| Example | D | E |
|---|---|---|
| PSF | 85 | 85 |
| OC415 A | 15 | 0 |
| OC165 A | 0 | 15 |
| % Elong. @ break | 4.5 | 3.8 |
| Flex Mod. Kpsi | 597 | 665 |
| Strain @ break % | 6.8 | 4.5 |
| N. Izod ft-lbs/in | 1.3 | 1.2 |
| Un Izod ft-lbs/m | 13.5 | 12.7 |
| Reverse N. Izod ft-lbs/in | 9.5 | 9.1 |
| Biaxial impact Total Energy ft-lbs | 11.3 | 11.1 |

PSF = UDEL NT1700 diphenyl sulfone bisphenol-A polymer
OC415 A is an olefin wax coated borosilicate E Glass
OC165 A is an organo silane coated borosilicate E Glass The blends of the present invention exhibited improved impact strengths compared to blends using other reinforcing fibers. Improvements were seen in either notched Izod, unnotched Izod, reverse notched Izod, biaxial impact tests and/or tensile or flexural elongation.

As is clear from the above examples, the compositions of the present invention exhibit improved properties over numerous other conventional fibers having various sizing agents thereon.

What is claimed is:

1. A thermoplastic resin composition, comprising:
   a thermoplastic polyether sulfone resin derived from biphenol and an aryl sulfone; and
   glass fibers treated with a coating agent comprising at least 50 weight percent of a polyolefin wax, wherein the polyolefin wax comprises polyethylene wax, polypropylene wax, polyethylene-propylene wax, or polyethylene-butylene wax.

2. The composition of claim 1, comprising 5–50% by weight of the glass fibers, based on the total weight of the composition.

3. The composition of claim 1, comprising 5–25% by weight of the glass fibers, based on the total weight of the composition.

4. The composition of claim 1, wherein the glass fibers comprise 0.1–5.0% by weight of the polyolefin wax.

5. The composition of claim 1, wherein the glass fibers comprise 0.5–2.0% by weight of the polyolefin wax.

6. The composition of claim 1, when molded at a thickness of 1/8 inch, which has a flexural modulus of $\geq 400,000$ psi as measured by ASTM D790 and a notched Izod impact value of $\geq 2$ ft.-lbs./inch as measured by ASTM D256.

7. The composition of claim 6, wherein the flexural modulus is less than or equal to 1,000,000 psi.

8. The composition of claim 1, when molded at a thickness of 1/8 inch, which has a flexural modulus of $\geq 400,000$ psi as measured by ASTM D790 and an unnotched Izod impact value of $\geq 15$ ft.-lbs./inch as measured by ASTM D256.

9. The composition of claim 8, wherein the flexural modulus is less than or equal to 1,000,000 psi.

10. The composition of claim 1, wherein the polyether sulfone comprises at least 50 mole % of its main chain ether linkages derived from biphenol.

11. The composition of claim 1, wherein the polyether sulfone comprises at least 75 mole % of its main chain ether linkages derived from biphenol.

12. The composition of claim 1, wherein the polyether sulfone is the polycondensation product of biphenol with 4,4'-dichlorodiphenyl sulfone.

13. The composition of claim 1, wherein the glass fiber is further treated with a functionalized silane.

14. The composition of claim 13, wherein the functionalized silane comprises a functional group selected from the group consisting of: amine, amide, epoxy, alkoxy and mercapto.

15. The composition of claim 14, wherein the functionalized silane is selected from the group consisting of aminopropyl triethoxy silane, glycidyl propyl trimethoxy silane, (3,4-epoxycyclohexyl)ethyl triethoxy silane, mercaptopropyl alkoxy silane, aminoethyl aminopropyl alkoxy silane, and ureido-alkyl triethoxy silanes.

16. The composition of claim 1, further comprising an additive selected from the group consisting of mineral fillers, colorants, stabilizers, mold release agents, lubricants, flame retardants, smoke suppressors, anti-drip agents, and ultraviolet light stabilizers.

17. A molded article comprising the composition of claim 1.

* * * * *